(12) United States Patent
Sundaresan

(10) Patent No.: US 7,996,270 B2
(45) Date of Patent: Aug. 9, 2011

(54) COMMUNITY BASED NETWORK SHOPPING

(75) Inventor: Neelakantan Sundaresan, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1276 days.

(21) Appl. No.: 11/278,113

(22) Filed: Mar. 30, 2006

(65) Prior Publication Data

US 2007/0239552 A1   Oct. 11, 2007

(51) Int. Cl.
*G06Q 30/00* (2006.01)
(52) U.S. Cl. ..................... 705/26.1; 705/27.1
(58) Field of Classification Search ............. 705/26, 705/37, 26.1, 27.1
See application file for complete search history.

(56) References Cited

U.S. PATENT DOCUMENTS

| | | | |
|---|---|---|---|
| 6,892,179 B1 | 5/2005 | Zacharia | |
| 6,957,199 B1 | 10/2005 | Fisher | |
| 7,197,475 B1 * | 3/2007 | Lorenzen et al. | 705/26 |
| 7,356,490 B1 * | 4/2008 | Jacobi et al. | 705/27 |
| 7,444,297 B2 * | 10/2008 | Shah | 705/26 |
| 2002/0055878 A1 | 5/2002 | Burton et al. | |
| 2004/0002896 A1 | 1/2004 | Alanen et al. | |
| 2005/0192958 A1 | 9/2005 | Widjojo et al. | |
| 2006/0271460 A1 | 11/2006 | Hanif | |
| 2007/0088652 A1 | 4/2007 | Firmage et al. | |
| 2007/0288602 A1 | 12/2007 | Sundaresan | |
| 2008/0004941 A1 | 1/2008 | Calabria | |

OTHER PUBLICATIONS

Broida, Rick, "Secrets of Online Power Shopping—E-tailers offer cool tools to help you shop better, smarter, and more often" Computer Shopper, v 21, n 11, p. 140, published Nov. 1, 2001, downloaded from Dialog Web on Mar. 21, 2011, 7 pages.*
"U.S. Appl. No. 10/968,197, Response filed Sep. 13, 2010 to Final Office Action mailed May 12, 2010", 16 pgs.
"U.S. Appl. No. 11/238,310, Appeal Brief filed Mar. 16, 2010", 23 pgs.
"U.S. Appl. No. 11/238,310, Examiner's Response to Appeal Brief mailed Apr. 15, 2010", 11 pgs.
"U.S. Appl. No. 11/238,310, Reply filed Jun. 15, 2010 to Examiner's Response to Appeal Brief mailed Apr. 15, 2010", 8 pgs.
"U.S. Appl. No. 11/636,257, Non-Final Office Action mailed Jun. 25, 2010", 13 pgs.
"U.S. Appl. No. 11/636,257, Response filed Sep. 21, 2009 to Restriction Requirement mailed Aug. 21, 2009", 11 pgs.
"U.S. Appl. No. 11/636,257, Response filed Sep. 27, 2010 to Non Final Office Action mailed Jun. 25, 2010", 14 pgs.
"U.S. Appl. No. 11/636,257, Restriction Requirement mailed Aug. 21, 2009", 6 pgs.
U.S. Appl. No. 10/968,197, Final Office Action mailed May 12, 2010, 30 pgs.
U.S. Appl. No. 10/968,197, Non-Final Office Action mailed Oct. 16, 2009, 17 pgs.
U.S. Appl. No. 10/968,197, Response filed Jan. 19, 2010 to Non Final Office Action mailed Oct. 16, 2009, 16 pgs.

(Continued)

*Primary Examiner* — James Zurita

(74) *Attorney, Agent, or Firm* — Schwegman, Lundberg & Woessner, P.A.

(57) ABSTRACT

A system receives item data corresponding to an item list from a user. The item list may include one or more items. The system communicates the item list to a community group associated with the user and the system then receives member data from one or more members of the community group, wherein the member data is associated with the one or more items on the item list.

24 Claims, 10 Drawing Sheets

OTHER PUBLICATIONS

U.S. Appl. No. 11/238,310, Advisory Action mailed Mar. 5, 2009, 3 pgs.

U.S. Appl. No. 11/238,310, Final Office Action mailed Sep. 30, 2009, 9 pgs.

U.S. Appl. No. 11/238,310, Final Office Action mailed Nov. 26, 2008, 10 pgs.

U.S. Appl. No. 11/238,310, Non Final Office Action mailed May 1, 2008, 9 pgs.

U.S. Appl. No. 11/238,310, Non Final Office Action mailed Jun. 1, 2009, 20 pgs.

U.S. Appl. No. 11/238,310, Pre-Appeal Brief Request mailed Nov. 30, 2009, 4 pgs.

U.S. Appl. No. 11/238,310, Preliminary Amendment mailed Jul. 7, 2006, 12 pgs.

U.S. Appl. No. 11/238,310, Response filed Feb. 3, 2009 to Final Office Action mailed Nov. 26, 2008, 10 pgs.

U.S. Appl. No. 11/238,310, Response filed Jul. 31, 2008 to Non Final Office Action mailed May 1, 2008, 15 pgs.

U.S. Appl. No. 11/239,310, Response filed Jul. 22, 2009 to Non Final Office Action mailed Jun. 1, 2009, 11 pgs.

"http://web.archive.org/web/20030801 073413/pages.ebay.com/index. html?ssPageName+h: H:home:US", www.eBay.com.

"http://web.archive.org/web/20040407121828/www.ebay.com/Homepage/companyoverview", (2004).

"U.S. Appl. No. 11/636,257, Final Office Action mailed Nov. 26, 2010", 12 pgs.

"U.S. Appl. No. 11/636,257, Response filed Feb. 23, 2011 to Final Office Action mailed Nov. 26, 2010", 20 pgs.

* cited by examiner

| | | USER CREATED ITEM LIST | | | |
|---|---|---|---|---|---|
| ITEM | MFG | MODEL | RECOM/REVIEW | PURCHASED | ADD TO CART |
| 1. PORTABLE MUSIC PLAYER | N/A | N/A | CLICK TO ADD | | |
| RECOMMENDATIONS | APPLE | IPOD | CLICK TO ADD | ☑ | ☐ |
| | SONY | MINIDISK 200 | CLICK TO ADD | ☐ | ☐ |
| 2. 60 INCH SONY PLASMA<br>NOTES: PLEASE ADD A REVIEW | SONY | SN2345P | CLICK TO READ | ☐ | ☑ |
| 3. STEREO SYSTEM | BOSE | LIFESTYLE 48 | CLICK TO ADD | ☐ | ☑ |
| 4. GIFT FOR 12 YEAR<br>OLD DAUGHTER<br>NOTES: PLEASE MAKE RECOMMENDATIONS | N/A | N/A | CLICK TO ADD | | |
| RECOMMENDATIONS | N/A (NONE MADE YET) | | | | |

FIG. 5A

| | COMMUNITY GROUP | |
|---|---|---|
| PERSON | ROLE | RULES |
| 1. MOTHER | DISTRIBUTOR | CAN'T DISTRIBUTE TO FATHER |
| 2. UNCLE | DISTRIBUTOR | CAN'T SEE ITEM 1 |
| 3. BOWLING TEAM | VIEWER | CAN ONLY SEE ITEMS 2&3 |

FIG. 5B

COMMUNITY BASED NETWORK SHOPPING

TECHNICAL FIELD

This application relates to a method and system for community based network shopping, according to one embodiment, by creating and sharing a shopping item list among a defined community.

BACKGROUND

Currently, online or network shopping is limited in scope and functionality. In first case, a user can shop or navigate an e-commerce website and add items to a personal electronic shopping cart. In some cases, a user may be able to read a review associated with the product prior to adding it to the user's electronic shopping cart. When finished shopping, the user may inspect the contents of the electronic shopping cart, select shipping options, and pay for the items. In a second case, a user may register with a website and create a personal item list for items that friends and family may use to purchase those items from that website. For example, a couple may register for their wedding gifts on the website and invited guests may go to the website and select and purchase items from the couple's list. In a third case, a user can find a product on a website, bookmark it and attach tags to it. Then the user can share the tagged bookmarked pages with the user's friends.

However, these lists and their associated functions are very limited. In the first case, the user's electronic shopping cart can only contain specific items the website offers and has no exposure to other people for comment, opinions, etc. Similarly, the second case only allows for guests to peruse and buy only those specific items the couple has selected and is found on the registry website. The third case is a little more flexible than the second, but still only allows the user's friends to navigate to specific websites for specific items chosen by the user.

BRIEF DESCRIPTION OF THE DRAWINGS

The present invention is illustrated by way of example, and not by way of limitation, in the figures of the accompanying drawings in which:

FIGS. 5A through 5E illustrate example embodiments of displays associated with creating and maintaining an item list, including displays associated with an item list, a community group, recommendations, reviews, and a electronic shopping cart.

DETAILED DESCRIPTION

Figure 1:
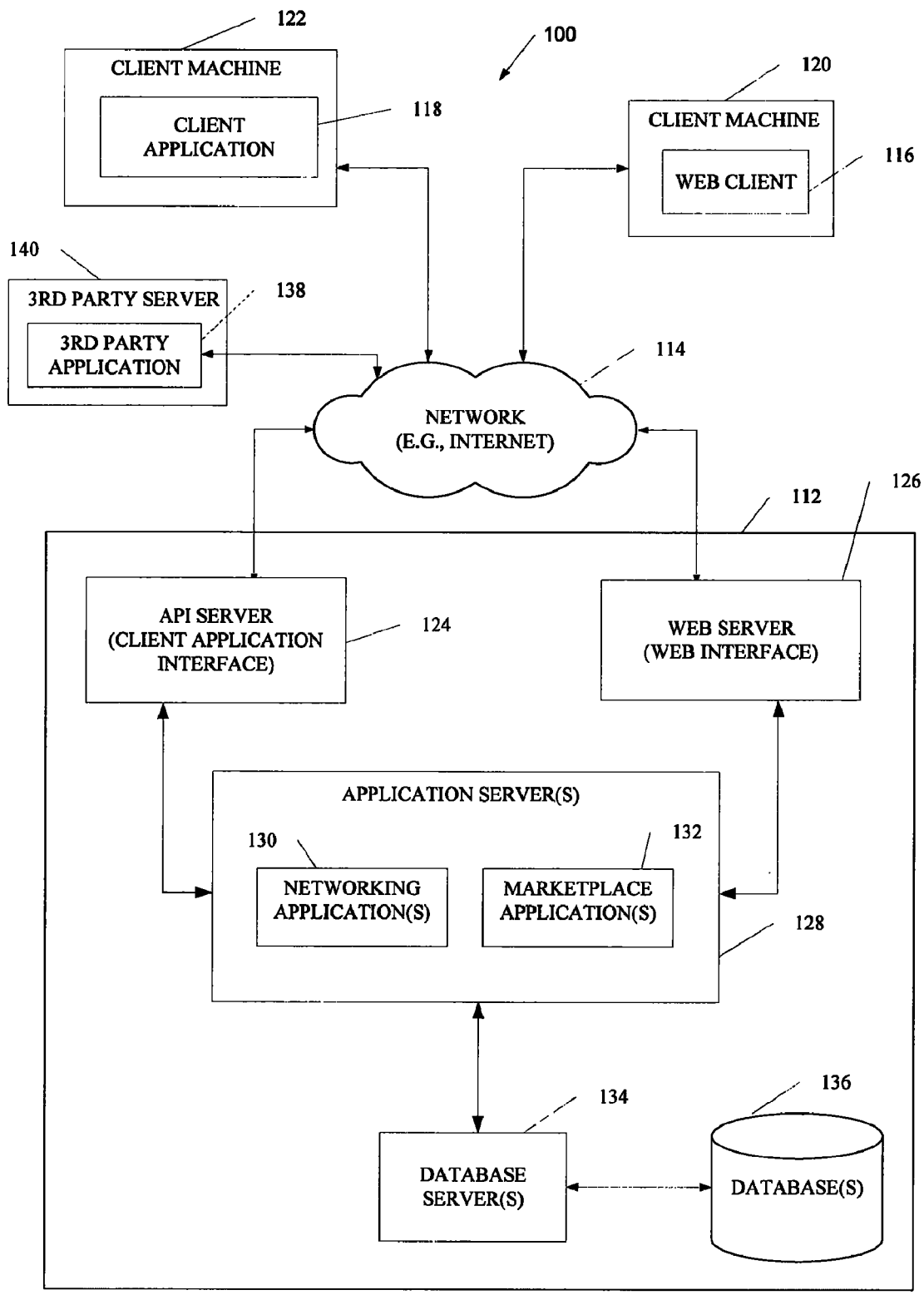
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, the data may pertain to various functions (e.g., online purchases) and aspects (e.g., managing social networks) associated with the network system 100.

A data exchange platform, in an example form of a network-based provider 112, provides server-side functionality, via a network 114 (e.g., the Internet) to one or more clients. The one or more clients may include users that may utilize the network system 100 and more specifically, the network-based provider 112, to exchange data over the network 114. These transactions may include receiving and processing data from a multitude of users. The data may include, but is not limited to, shared item (shopping) lists, shared electronic shopping carts, product and service reviews, product, service, manufacture, and vendor recommendations, product and service listings, auction bids, feedback, etc. In one embodiment, the product and service reviews, and the product, service, manufacture, and vendor recommendations are associated with one or more item lists generated by a user and maintained on the network-based provider 112.

Turning specifically to the network-based marketplace 112, an application program interface (API) server 124 and a web server 126 are coupled to, and provide programmatic and web interfaces respectively to, one or more application servers 128. The application servers 128 host one or more networking applications 130 and marketplace applications 132. The application servers 128 are, in turn, shown to be coupled to one or more databases servers 134 that facilitate access to one or more databases 136.

The marketplace applications 132 may provide a number of marketplace functions and services (e.g., listing, payment, etc.) to users that access the network-base marketplace 112. The networking applications 130 likewise may provide a number of social networking services and functions to users. The networking applications 130 may allow a user to generate an ace this item list, which may include items (e.g., products and services) and categories associated with items, or a combination thereof. In one embodiment, the items and categories of items are gifts associated with a designated entity or event (e.g., pet, friend, housewarming, etc.). The networking applications 130 may allow the user to distribute the item list to one or more groups defined by user (e.g., "my family," "my friends," etc.) or to groups at various levels in a predefined category (e.g., "auto group," "Ford group," "Ford Mustang Group," etc.).

While the networking applications 130 and the marketplace applications 132 are shown in FIG. 1 to both form part of the network-based marketplace 112, it will be appreciated that, in alternative embodiments, the networking applications 130 may form part of a social networking service that is separate and distinct from the marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
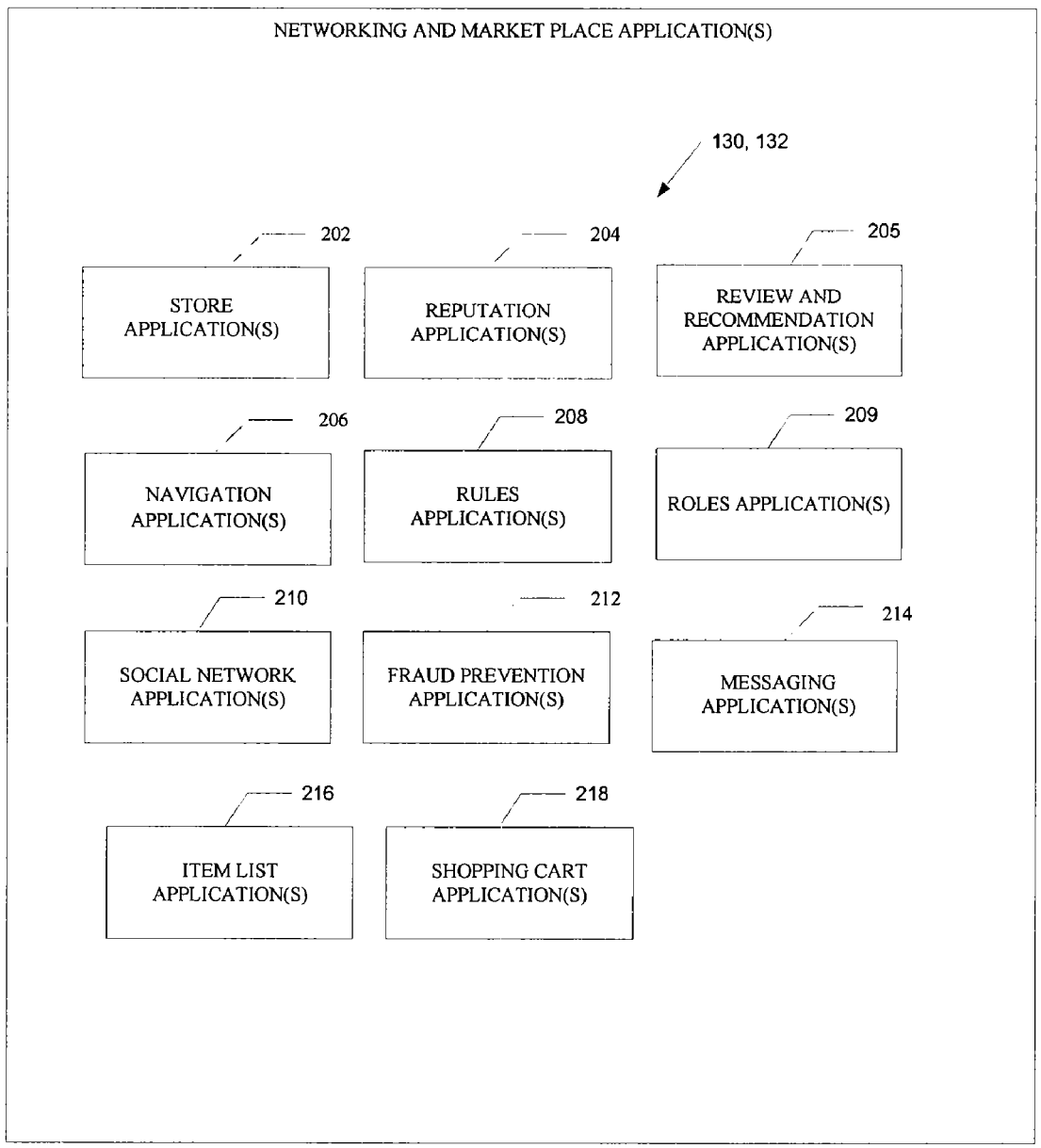
FIG. 2 is a block diagram illustrating an example embodiment of multiple network and marketplace applications, which are provided as part of the network-based marketplace.

FIG. 2 is a block diagram illustrating an example embodiment of multiple network and marketplace applications 130 and 132, respectively, which are provided as part of the network-based marketplace 112. The marketplace 112 may provide a number social networking, shopping, and listing and price-setting mechanisms whereby a seller may list goods and/or services (e.g., for sale). A group member associated with a community group created or selected by a user can express interest in or indicate a desire to purchase items such as goods and/or services associated with the user's item list. Additionally, a group member associated with a community group may provide suggested gift ideas based on the category or other attribute of item (e.g., portable music player or gift for 13 year old sister) or provide a review of or opinion on a specific item (e.g., Apple iPod®) found on the item list.

To this end, the network and marketplace applications 130 and 132, respectively, are shown to include one or more applications which support the network-based marketplace 112, and more specifically the generation and maintenance of an item list and its associated relationships, community groups and its members' rules and roles, and transactions that may be associated with a shared electronic shopping cart including the items from the item list. The associated relationships may include item list distribution parameters (e.g., roles and rules pertaining to the item list and associated community group(s)), reviews and recommendations pertaining to the items of the item list, item attributes like model and manufacturer, or service provider of a particular item, item status (e.g., purchased), etc. Additionally, the various applications may support social networking functions, including building and maintaining the community groups created by a user, relating one or more item lists to selected community groups, and providing a shared electronic shopping cart for the community groups to purchase items from the shared item list.

Store applications 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller. In one embodiment, the listings and/or transactions associated with the virtual store and its features may be provided to one or more community groups having an existing relationship with the item list creator. An existing relationship or association may include a friend or family relationship, a transactional relationship (e.g., prior sales with user), or an overall network community relationship (e.g., buyers historical transaction rating).

Reputation applications 204 may allow parties that transact utilizing the network-based marketplace 112 to establish, build and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation applications 204 may allow a user, for example through feedback provided by other transaction partners, to establish a reputation within the network-based marketplace 112 over time. Other potential trading partners may then reference such a reputation for the purposes of assessing credibility, trustworthiness, or the like. A user creating a shared item list and seeking reviews and recommendations associated with the listed items may therefore rely, all or in part, on another user's established credibility in determining whether or not to add that person to their community group, which may access the shared item list, and in some embodiments, make purchases based on the shared item list.

In one embodiment, the network-based marketplace 112 includes review and recommendation applications 205. The social networking applications 210 may work in conjunction with the review and recommendation applications 205 to provide a user interface to facilitate the entry of reviews of the items on the list and recommendations for items on the list. A review may be a text entry of the community group member's opinion, a standard review form including check boxes indicating a level satisfaction, a combination of both, etc. Recommendations may include a specific type of item, a specific brand or service for a type of item, a specific retailer for the item, etc. In one embodiment, the review and recommendations applications 205 may push a request for one or more selected members of a community group associated with the item list to submit one or more reviews and/or recommendations of one or more items of the item list.

Navigation of the network-based marketplace 112 may be facilitated by one or more navigation applications 206. For example, a search application may, inter alia, enable key word searches of listings published via the marketplace 112. A browser application may allow users via an associated user interface to browse various category, catalogue, inventory, social network, and review data structures within the marketplace 112. Various other navigation applications (e.g., an external search engine) may be provided to supplement the search and browsing applications.

In one embodiment, using rules applications 208 and roles applications 209, a seller may customize an item list and its attributes by exclusively providing entities within the user defined community group rules and roles pertaining to one or more items of the item list. For example, the item list creator may not want a member of a community group to be able to view, purchase, edit, etc. any or all of the items on the item list. For example, rules may include an ability to purchase an item on the list, purchase using the creator's account, add to the item list, etc. Additionally, the item list creator may want to assign roles to an entity within the community group. For example, roles may include a buyer, a reviewer, administrator, etc. Accordingly, the rules applications 208 and the roles applications 209 may be used in conjunction with social networking applications 210 to customize the item list to be shared within one or more community groups. The relationship or association between the item list creator (user) and the members of the one or more community groups may be a direct relationship or an indirect relationship. For example, a direct relationship may be a sister, a friend, or a trusted associate user, while the indirect relationship may be a secondary entity brought in by a direct relationship. For example the sister (direct relationship) shares the list with her friend, and so on.

A number of fraud prevention applications 212 may implement various fraud detection and prevention mechanisms to reduce the occurrence of fraud within the marketplace 112. In one embodiment, the fraud prevention applications 212 may monitor activities of each user within the community group.

For example, the item list creator may want to be informed if a member of the community group adds items to the list or changes shipping information, provided the member had the necessary permissions. In various embodiments, whether to monitor and the level of monitoring may depend upon the relationship to the item list creator. For example, an indirect relationship may be more heavily monitored than a direct relationship.

Messaging applications 214 may be used for the generation and delivery of messages to users of the network-based marketplace 112, such messages for example advising the item list creator and members of the community groups associated with an item list the status of the various items on the list (e.g., already purchased, etc.) In one embodiment, the messaging applications 214 may be used in conjunction with the social networking applications 210 to provide promotional and/or marketing to the community members associated with the item list to assist them in finding and purchasing items on the item list.

Item list application(s) 216 may be used in the network-based marketplace 112 by a user to create an item list to be shared within a community group created or designated by the user. The item list applications 216 may be accessed via a user interface that allows the user to create the item list and may operate in conjunction with the social networking applications 210, the rules applications 208 and the roles applications 209, thereby allowing the user to associate the item list with the community group. In various embodiments, the item list may include specific products, services or more abstract item requests associated with an entity, event, or occasion. For example, the item list may include specific items (e.g., brand and model) and specific services (e.g., XYZ car wash gift certificate), or broader categories such as occasions (e.g., anniversary gift), people (e.g., 12 year old daughter), etc. This item list association with the community group, in an example embodiment, allows the item list creator the ability to solicit collaboration (e.g., recommendations, review, etc.) among the members of the community group (e.g., friends and family) to assist the item list creator in finding and buying a specific gift from a broad request.

In one embodiment, electronic shopping cart application(s) 218 are used to create a shared electronic shopping cart used by the members of the community group to add and store items from the item list and its derivatives, such as the associated recommendations for more broadly defined items. For example, the item may be a music player and the recommendation from a community group member may be an Apple iPod®. The electronic shopping cart applications may also be used to "check out," meaning one or more members may purchase items from the electronic shopping cart. In one embodiment, a bulk purchase of all items is made through a single click of a "Bulk Purchase" interactive element (e.g., See FIG. 5E). The electronic shopping cart applications 218 may facilitate the transactions by automatically finding the items in the shared electronic shopping cart across at least one or all of a predefined set of vendors, a comparison shopping site, an auction site, etc. To the user, the multitude of transactions appears as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more the various example networking and marketplace applications 130, 132 may be combined into a single application. Further, in some embodiments of the inventions one or more applications may be omitted and additional applications may also be included.

Figure 3:
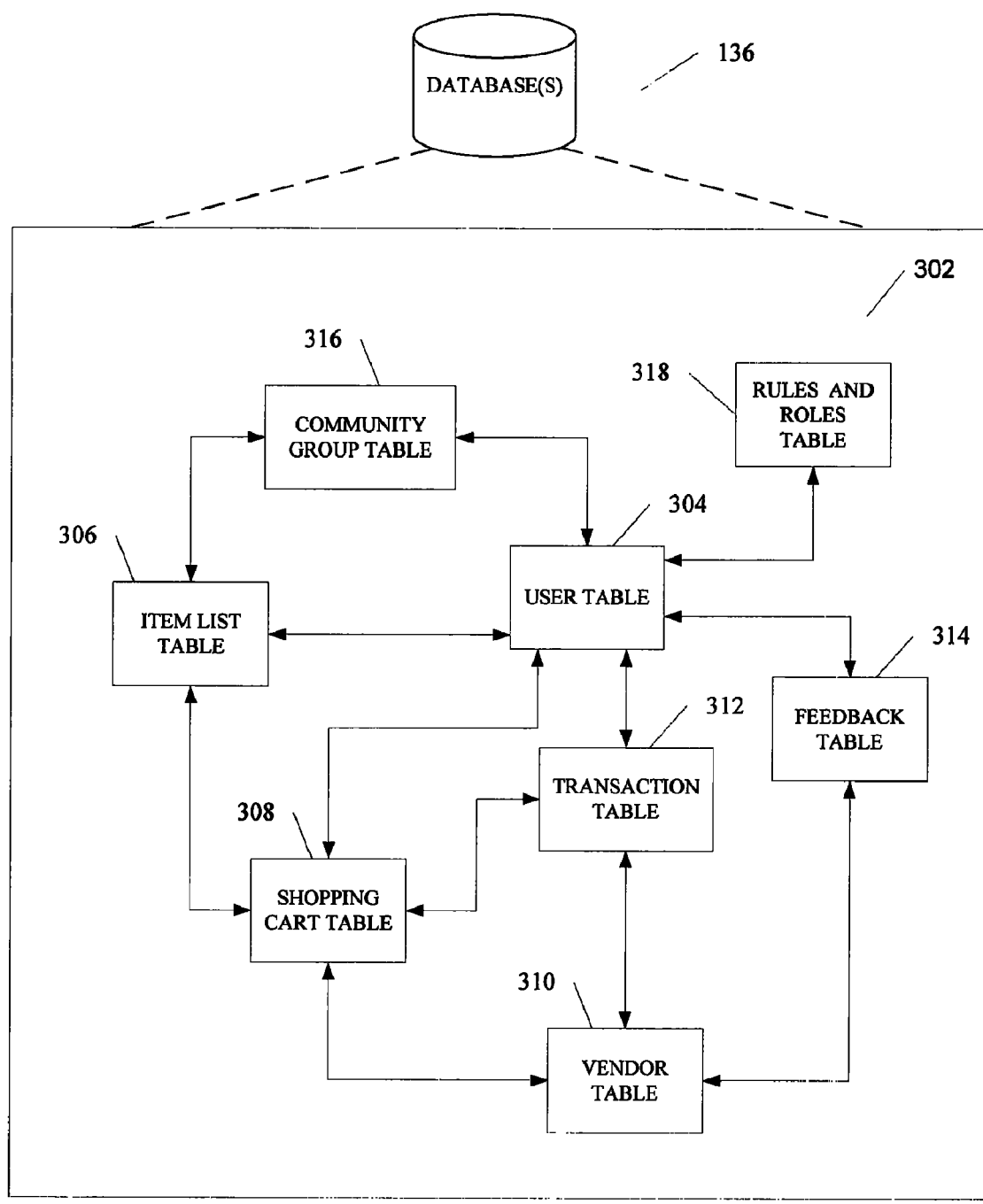
FIG. 3 is a high-level entity-relationship diagram, in accordance with one example embodiment, illustrating various tables that may be maintained within one or more databases.

FIG. 3 is a high-level entity-relationship diagram, in accordance with an example embodiment, illustrating various tables 302 that may be maintained within the databases 136 (see FIG. 1), and that may be utilized by and support the networking and marketplace applications 130 and 132, respectively. A user table 304 may contain a record for each registered user of the network-based marketplace 112, and may include identifier, address and financial instrument information pertaining to each such registered user. In one embodiment, a user operates as an item list creator or a member of a community group, including associated operations pertaining to the rules and roles, created by the with list creator. A user may also operate as a seller, a buyer, or both, within the network-based marketplace 112.

The tables 302 may also include an item list table 306 which maintains listing or item records for goods and/or services that were created by an item list creator using the item list applications 216. In one embodiment, the item list is created to be shared with a community group at least defined in part by the item list creator. Each listing or item record within the item list table 306 may furthermore be linked to one or more electronic shopping cart records within a electronic shopping cart table 308 and to one or more user records within the user table 304 and/or a vendor table 310, so as to associate a seller or vendor and one or more actual or potential buyers from the community group with each item record.

A transaction table 312 may contain a record for each transaction pertaining to items or listings for which records exist within the items table 306. For example, a purchase transaction of an item of the item list by a member of the community group.

In one example embodiment, a feedback table 314 may be utilized by one or more of the reputation applications 204 to construct and maintain reputation information associated with users (e.g., members of the community group, sellers, etc.).

Group(s) of users found in a community group table 316 may be selected by an item list creator to be members of a community group having access to an item list and electronic shopping cart. In one embodiment, the members of the community group have a direct relationship with the item list creator. In another embodiment, one or more of the members have an indirect relationship or no relationship to the item list creator.

One or more members of a community group may be subject to rules and roles assigned by the item list creator and thus linked to a rules and roles table 318 via the user table 304. The rules and roles table 318 may be used to store the representative records of the functions and operations that pertain to each rule and role.

A role may be linked to a member of the community group. For example, a member's role may be that of reviewer only. In this case, the reviewer cannot purchase an item for the list, make recommendations, etc. In various embodiments, a combination of roles may be assigned to a single member or an all encompassing administrative role may be assigned.

A rule may be linked to a member of the community group. The item list creator may create or use one or more rules that limit or extend the visibility and access of a member to the item list. For example, a particular item on the item list may be for a member of a community group defined by the item list creator. The item list creator may then create a rule to make the item and all its associated data, such as reviews and recommendations, invisible to that member. The rules may include authorization to allow or forbid a member from adding new members to the community group, deleting members, or distributing the item list to others outside the group.

Figure 4:
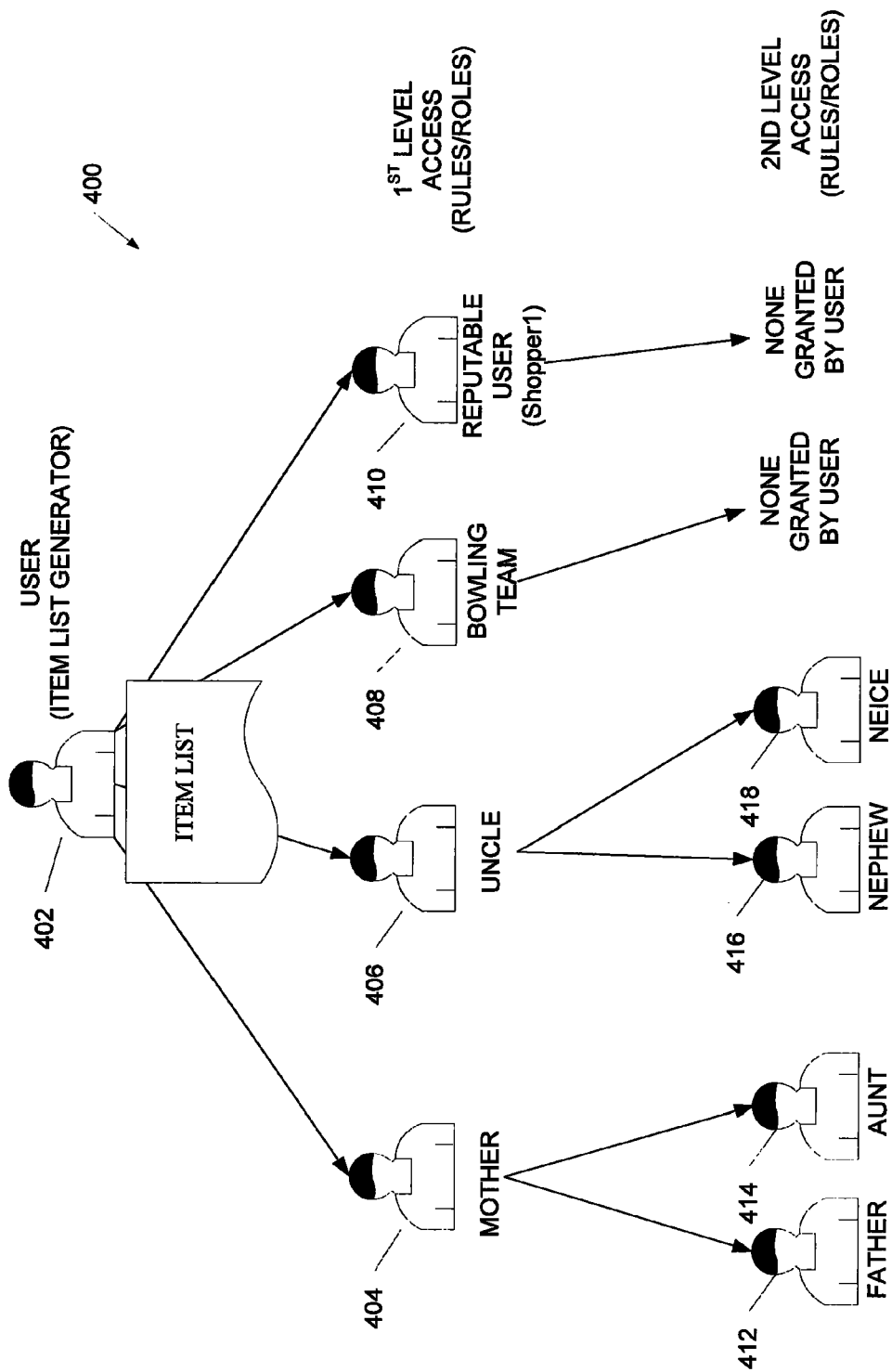
FIG. 4 illustrates a relationship diagram of a community group created by a user 402, according to an example embodiment.

FIG. 4 illustrates a relationship diagram of a community group 400 created by a user 402, according to an example embodiment. The community group 400 may include levels of association or relatedness to the user 402 (e.g., the item list generator). The community group 400 this that may be associated with the item list created by the user 402 may include direct relationships (first level) and indirect relationships (second level). The direct relationships in this example include a mother 404, an uncle 406, a bowling team 408 and a reputable user 410, screen name Shopper1 (e.g., a trusted user with whom the first user has previously conducted one or more transactions within the system). The indirect relationships may include other users via the one or more direct relationships. The indirect relationships in this example include a father 412 and an aunt 414 that obtained access to the item list via the mother 404, and a nephew 416 and a niece 418 that obtained access via the uncle 406.

The bowling team 408 is an example of a secondary community group allowed access to the item list by the user 402. As with the community group 400, the user 402 may edit access privileges by assigning rules and roles to members of the secondary group. For example, as shown in this diagram, the bowling team 408 (in its entirety) has not been granted access (or authorization) to allow its members to grant access to the item list to other entities (e.g., other users or community groups).

The reputable user 410 may be a user of the network-based marketplace 112 that has a particularly high user rating within the community. The user 402 may, for example, only grant the reputable user 410 access or visibility only to those items regarding which the user 402 would like to receive the reputable user's 410 recommendation or review. As previously discussed, the rules applications 208 and the roles applications 209 may be used in conjunction with other applications to allow and enforce these privileges and restrictions on members of the community with respect to the item list.

FIG. 5A illustrates a user created item list 502, according to one example embodiment. The user created list 502 may include sections or fields including item 504, manufacturer 506, model 508, recommendation/review 510, purchased 512, and add to cart 514. In this example, item 504 includes item 1—portable music player, item 2—60 inch Sony® plasma, item 3—a stereo system, and item 4—gift for 12 year old daughter. This example illustrates the flexibility of the item list since an item can be specifically requested or can be broadly requested, in which case the item list creator is soliciting recommendations. In the case of a specific request, such as for the stereo system, manufacturer 506 and model 508 may be filled in to further define the request. In the case of a broad request, such as for a portable music player (item 1), once recommendations have been made by the community group 400 having access to the item list 502, the item list 502 may then be updated as shown. In this case, as illustrated, recommendations for the portable music player have been made and the item list 502 updated.

When a request is so defined, either by the item list creator or via recommendations, additional functions and indicators may appear. For example, under purchased 512, a checkbox is displayed for all specifically defined items. This is an indication the item has been defined and has already been purchased by a member of the community group 400. To simplify this example, the empty checkboxes have been shown to clarify those specifically defined items have not been purchased.

Additionally, checkboxes under add to cart 514 may appear for specifically defined items. For example, as illustrated in the item list 502, a member of the community group 400 has selected the checkboxes under add to cart 514 for items 2 and 3 (60 inch plasma and stereo system).

Additionally, although not shown in this example embodiment, the items added under items 504 by the item list creator should not be limited to products and may be a service, particular event, or occasion. For example, the item list creator may be looking to obtain recommendations and reviews for a health spa as a gift for a spouse or may be looking for recommendations and reviews for gifts appropriate as an anniversary or birthday gift for their spouse.

FIG. 5B illustrates an example embodiment of a community group display 530 presenting the roles and rules associated with each member of the community group 400. The community group display 530 includes sections or fields pertaining to entity 532, role 534, and rules 536. For example, entity 1 is "mother" and she has a role of distributor and has been limited with respect to whom she may distribute the item list 502. In this example, she cannot distribute the list to "father", possibly because all or a portion of the item list 402 includes items being sought for "father." Alternatively, a rule could have been created to prevent "father" from seeing the items that pertained to him, if father was originally added to the community group 400 by the item list creator. In another embodiment, an entity may be given a role of "administrator" (not shown), which may allow the entity to modify the item list 502, such as adding members to the community group 400, creating rules for members, adding items, etc.

Figure 5C:
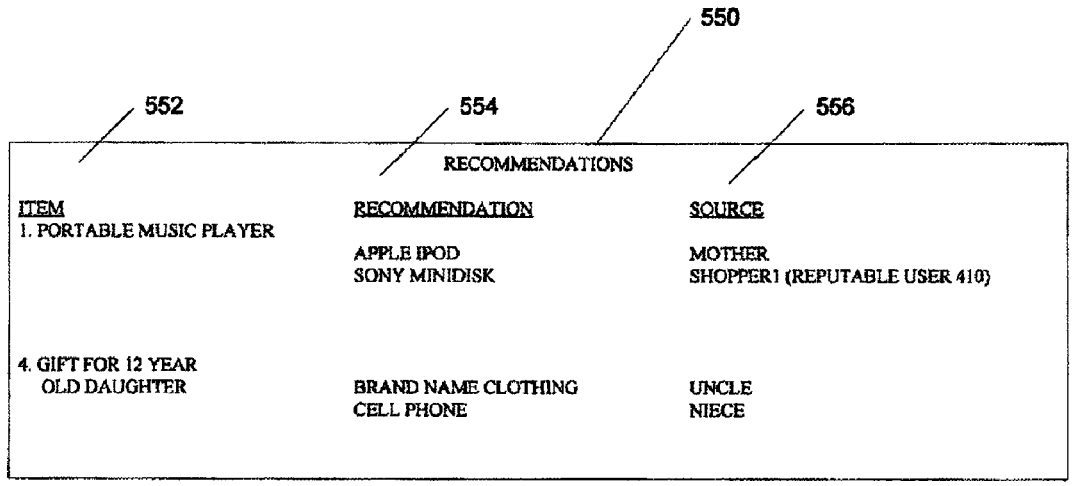

FIG. 5C illustrates an example embodiment of a recommendations display 550 presenting recommendations made by members of the community group 400. The recommendations display 550 includes sections or fields pertaining to items 552, recommendation 554, and source 556. The item 552 includes those items from the item list 502 that recommendations have been made (e.g., via "click here") by a member of the community group 400. For example, for item 1—portable music player, recommendations for an Apple Ipod® and Sony Minidisk® have been made by the members, "mother" and "shopper1," respectively. In one embodiment, these recommendations are then displayed in an updated version of item list 402 as specific items that may be reviewed or added to the electronic shopping cart for purchase. A similar example is illustrated with respect to recommendations for a different category of item in item 4—gift for 12 year old daughter. In this case, recommendations are sought for a category of person and not for a particular category of product (e.g., music player).

Figure 5D:
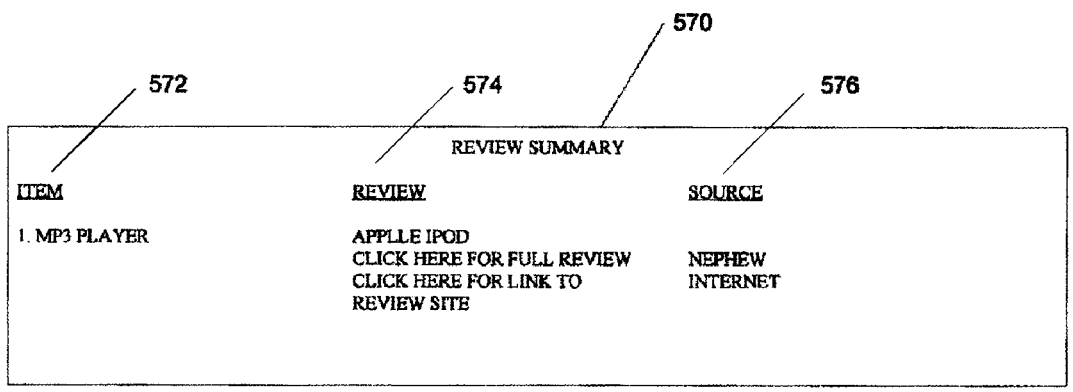

FIG. 5D illustrates an example embodiment of a review summary display 570 presenting a summary of all reviews available that have been made by members of the community group 400. The review summary display 570 includes sections or fields pertaining to item 572, review 574, and source 576. The item 572 includes those items from the item list 502 that reviews have been submitted (e.g., via "click here") by a member (e.g., source 576) of the community group 400. In one embodiment, a link is given to a file or location of the review left by a member. In another embodiment, a link is be given to a location of an outside source of reviews for the listed item under item 572. For example, the location may be a uniform resource location (URL) of an Internet website for providing reviews of that item. In one embodiment, the activation of the link also includes the opening of a browser program and an insertion of the text pertaining to the item under item 572 such that a search field for review site is automatically filled and submitted.

Figure 5E:
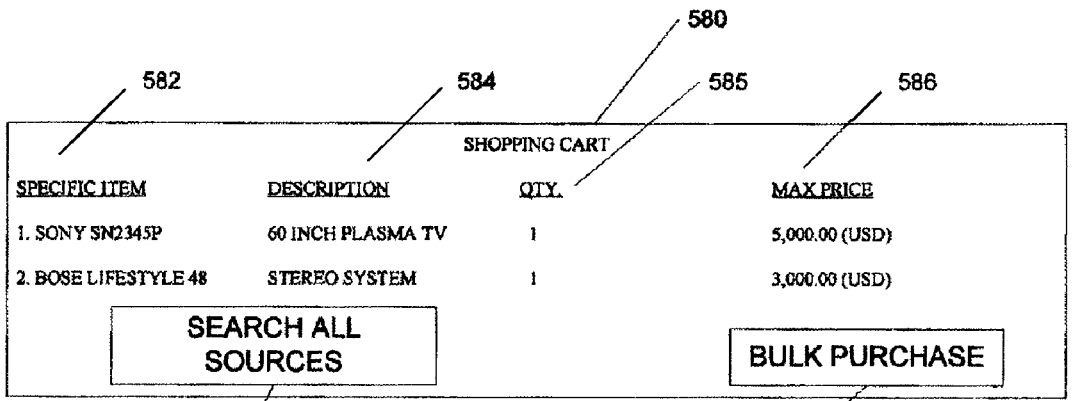

FIG. 5E illustrates an example embodiment of an electronic shopping cart display 580 presenting items that have been put into the electronic shopping cart by one or more members of the community group 400. The electronic shopping cart display 580 includes sections or fields pertaining to a specific item 582 (as described above), a description 584, a quantity 585, a threshold value such as a max price 586, a search button 588, and a bulk purchase button 590. The item list creator may also create rules for how a electronic shopping cart is configured. For example, a member may not be able to purchase an item until all or a predetermined amount of items from the item list 402 have been put into the electronic shopping cart. The item list creator or another member (if granted sufficient access) may create a rule to put a limit on a price or quantity for a given item. This may be particularly relevant if the item list creator has given one or all of the members of the community group the power to purchase from the item list creator's payment and blue account (e.g., a PayPal® account). For example, a limit or threshold value of 5,000 USD (United States Dollars) has been established for the Sony SN2345P plasma television, as indicated under max price 586. In one embodiment, the quantity (e.g., quantity 585) may be an input field editable by a member of the community group but the underlying program may automatically limit the quantity amount according to a rule created by the item list creator.

The search button 588 may call upon another application (e.g., navigation applications 206) within the network-based system 112 to perform a vendor search for each item in the electronic shopping cart display 580. In various embodiments, the results returned (not shown) may include any combination of or all of a list of vendors (e.g., brick and mortar or e-commerce vendors), prices, bids (e.g., auction site bids), availability, shipping options, comparison charts, etc. The returns may also be limited by rules created by at least one of the item list creator or one or more members of the community group accessing the shared electronic shopping cart. For example, vendors returning prices higher than those listed under max price 586 may be ignored or displayed in a different context (e.g., color, font, separate page, etc.). Once a list has been returned to a user, the user may then have the option to purchase all or part of the items returned on the vendor list.

The bulk purchase button 590 may call upon one or more applications associated with the search button 588 functionality to locate all or part of the items found in electronic shopping cart display 580 that fit a particular criteria or rule created by the item list creator or member of the community group 400. For example, a first criteria or rule may be used to create a display that includes only those vendors with the lowest price. A second criteria or rule may be lowest price as determined by the combination of item price and shipping cost. After locating the items matching the criteria and/or rules, the items are automatically purchased. Although there may be a multitude of underlying transactions in purchasing the items from the one or more vendors, to a user it appears as a single purchase based on using the bulk purchase button 590. In various embodiments, automatic reports may be generated displaying what was purchased, from where, how much, and if applicable, what was not purchased. For example, some items may have fallen outside of the predefined criteria and were not purchased.

Although shown with example fields and functions, it can be appreciated the displays and interfaces associated with item list 502, community group 530, recommendations 530, and reviews summary 570 may be implemented in a wide variety of methods and programmatic languages known in the art and should not be construed in a limiting sense.

Figure 6A:
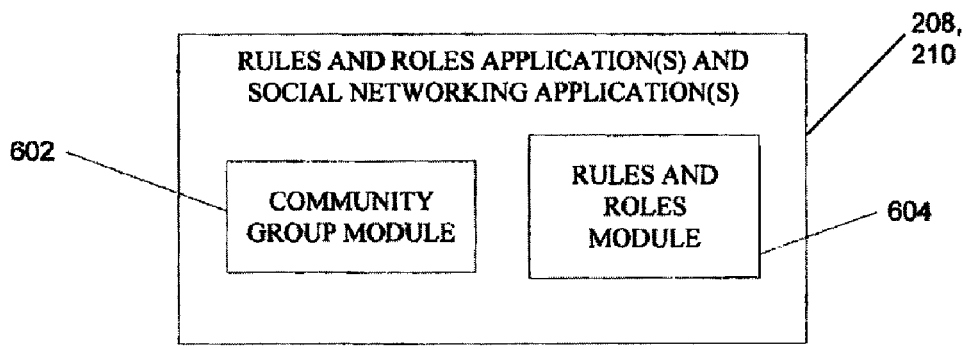
FIGS. 6A through 6D provide an example embodiment of functional modules pertaining to some of the applications associated with FIG. 2.

FIGS. 6A, 6B, 6C and 6D illustrate example embodiments of functional modules pertaining to some of the applications of FIG. 2. It will be appreciated that the applications and associated modules may be executed within any portion of the network system 100, (e.g., the client machine 118 and the network-based marketplace 112). FIG. 6A illustrates the rules applications 208 and the roles applications 209 and the social networking applications 210, which includes a community group module 602 and a rules and roles module 604. In one embodiment, the community group module 602 is utilized by the user 402 (e.g., item list generator) to create the community group 400. The community group 400, as discussed above, may include members that are direct relationships and members that are indirect relationships. Once created, all or part of the community group 400 may have access to or be recipients of the item list 502 to create a shared shopping experience. Once the community group 400 is created, the community group module 602 may then store the created community group 400 into the database 136, and more specifically the community group table 316 for access by other applications and modules within the network system 100. Examples of members within a community group created by the user 402 (item list generator) and their associated attributes are discussed above with reference to FIG. 5B.

The rules and roles module 604 may be used by its associated application to provide an interface to the user 402 to allow the creation of rules pertaining to the items and members of the community group 400 and allow the assignment of roles to members of the community group 400. Examples of rules and roles were discussed above.

Figure 6B:
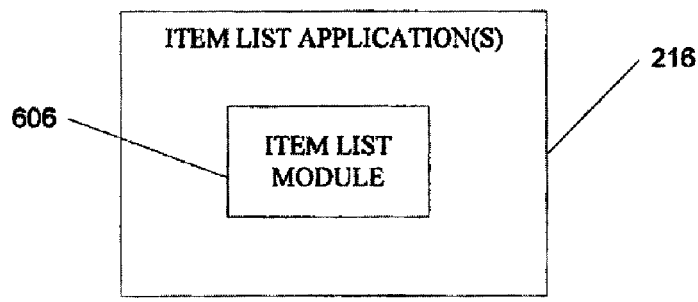

FIG. 6B is a block diagram illustrating an example embodiment of an item list generation module 606 which may be utilized by the item list applications 216. In one embodiment, the item list generation module 606 may provide the user 402 with a user interface, including displays and functions for inputting items (e.g., products, services, broad categories, etc.) into an item list (e.g., item list 502). Examples of items in an item list and their associated attributes are discussed above with reference to FIG. 5A. The item list generation module 606 may also facilitate the storage of the item list 502 into the database 136, and more specifically the item list table 306 for access by other applications and modules within the network system 100.

Figure 6C:
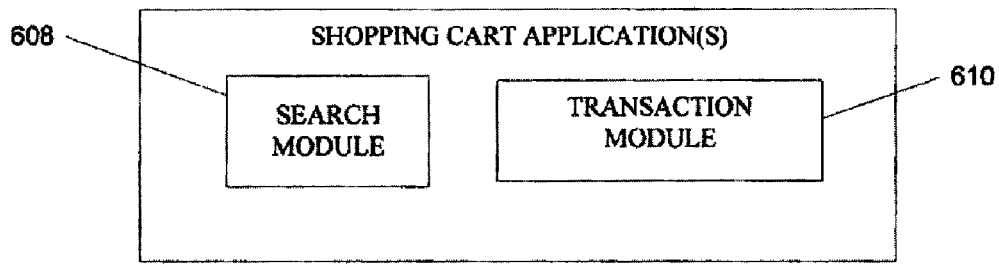

FIG. 6C is a block diagram illustrating an example embodiment of a search module 608 and a transaction module 610 which may be utilized by the electronic shopping cart applications 218. In one embodiment, the search module 608 may provide the user 402 with a user interface, including displays and functions for searching for vendors to purchase items (e.g., products, services, broad categories, etc.) from an item list (e.g., item list 502) and displays and functions for returning and displaying data associated with those searches. The transaction module 610 may provide the user 402 with a user interface, including displays and functions for purchasing specific items associated with the item list 502 and associated with the search results. In various embodiments, the electronic shopping cart applications 218 and associated modules may also be linked to other payment applications and modules (not shown) associated with the network system 100 to further facilitate the purchasing of items. Examples of items in an electronic shopping cart and their associated attributes are discussed above with reference to FIG. 5E.

Figure 6D:
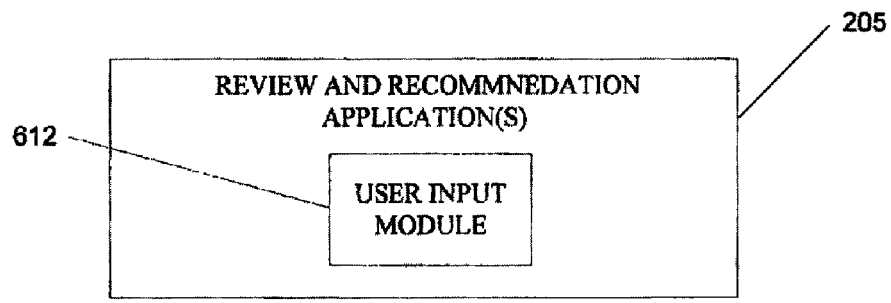

FIG. 6D is a block diagram illustrating an example embodiment of a user input module 612 which may be utilized by the review and recommendation applications 205. In one embodiment, the user input module 612 may provide the user 402 with a user interface, including displays and functions for reviewing items (e.g., products, services, broad categories, etc.) associated with an item list (e.g., item list 502) and, when appropriate (e.g., a non-specific item), for facilitating the input of recommendations for specific items to be added to the item list 502. Examples of reviews and recommendations are discussed above with reference to FIGS. 5C and 5D.

Figure 7:
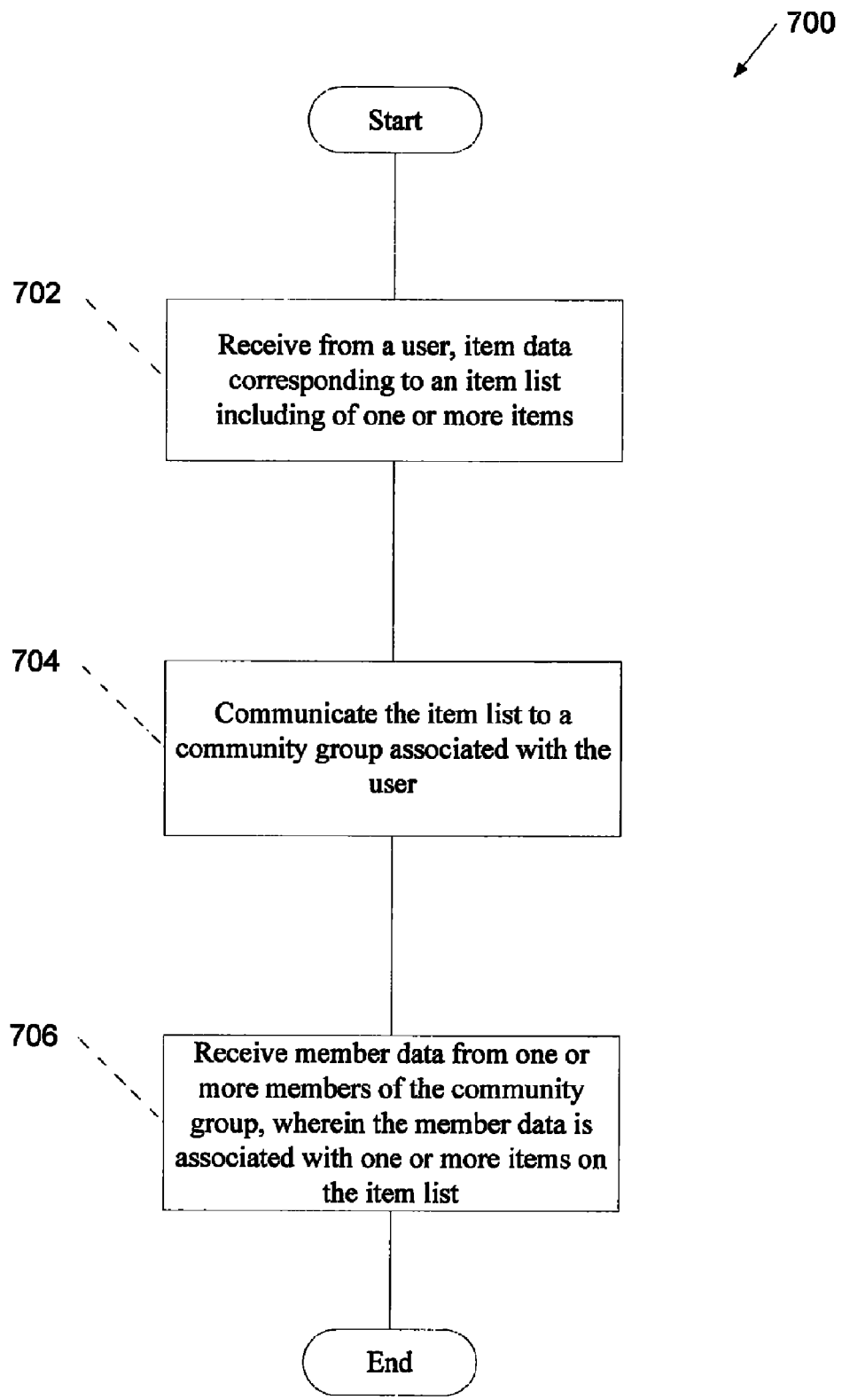
FIG. 7 is a flow chart illustrating an example embodiment of a method for creating an item list that may be shared among a community group.

FIG. 7 is a flow chart illustrating an example embodiment of a method 700 for creating an item list (e.g., item list 502) that may be shared among a community group (e.g., community group 400). At operation 702, item data corresponding to an item list (e.g., item list 502) is received from a user, wherein the item list includes one or more items (e.g., products, services, broad categories, etc.). Next, at operation 704, the item list is communicated to a community group (e.g., community group 400) associated with the user (e.g., user 402, item list creator). At operation 706, member data is received from one or more members (e.g., "mother" 404) of the community group. The member data may be associated with the one or more items on the item list. For example, member data may be a review of a specific item (e.g., specific make and model of a product) or a recommendation for a specific item associated with a broad category of item (e.g., anniversary gift or portable music player). In another embodiment, member data may be data associated with purchasing an item from the item list, adding a specific item to a shared electronic shopping cart, purchasing an item, etc.

Figure 8:
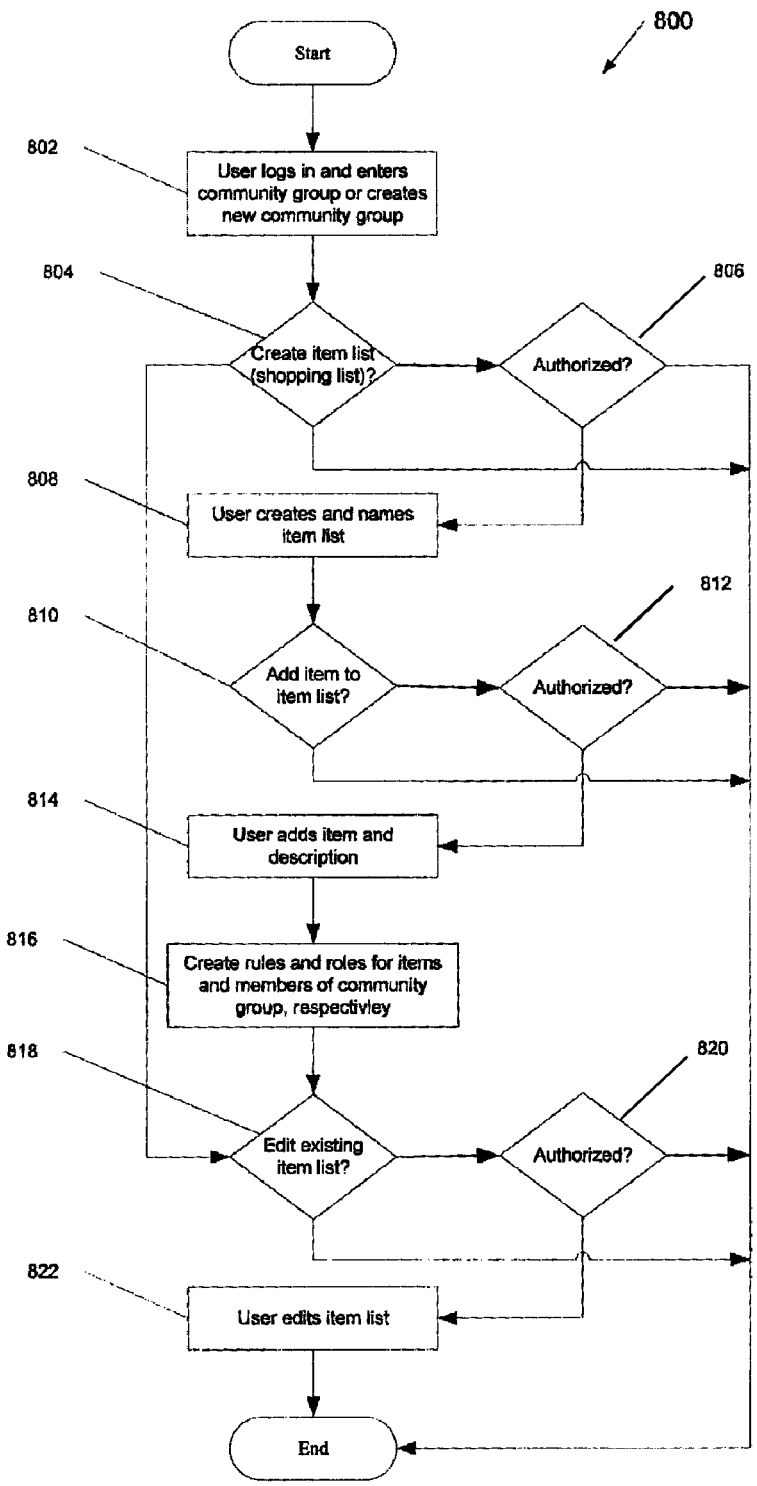
FIG. 8 is a flow chart illustrating an example embodiment of a method for creating an item list that may be shared among a community group.

FIG. 8 is a flow chart illustrating an example embodiment of a method 800 for creating an item list (e.g., item list 502) that may be shared among a community group (e.g., community group 400). At operation 802, a user (e.g., user 402, item list creator) logs in and enters a community group or creates a new community group. The user decides, at operation 804, whether or not to create an item list (e.g., a community shopping list). If no, the method 800 terminates. If yes, a determination is made at operation 806, if the user has authority (based on role, etc.) to create the item list. At operation 808, the user creates and names the item list. At operation 810, determine if the user wants to add an item to the item list. If no, quit, if yes determine, at operation 812, if the user has authority to add the item to the item list. If yes, then at operation 814, the user may add the item and any associated description to the item list.

At operation 816, the user may create rules and roles for items and members of the community group, respectively. For example, a rule may be created to hide or make invisible certain items on the list (such as the newly created item) to certain members of the community group. In one embodiment, a role of reviewer may be assigned to a particular member of the group thereby limiting or creating additional access by that member, as appropriate or defined. For example, a reviewer may have visibility to all items of the item list for review purposes, but may not have permissions to add additional items to the list.

If a user does not want to create an item list at operation 804, then it is determined at operation 818 if the user wants to edit an existing item list. If no, the method 800 terminates. If yes, determination is made at operation 820, if the user is authorized to do so. If yes, the user edits the item list at operation 822, if no the method 800 terminates. In one embodiment, the level of editing may depend on the role associated with the user wishing to make the edits or with rules associated with one or more of the items of the item list.

Figure 9:
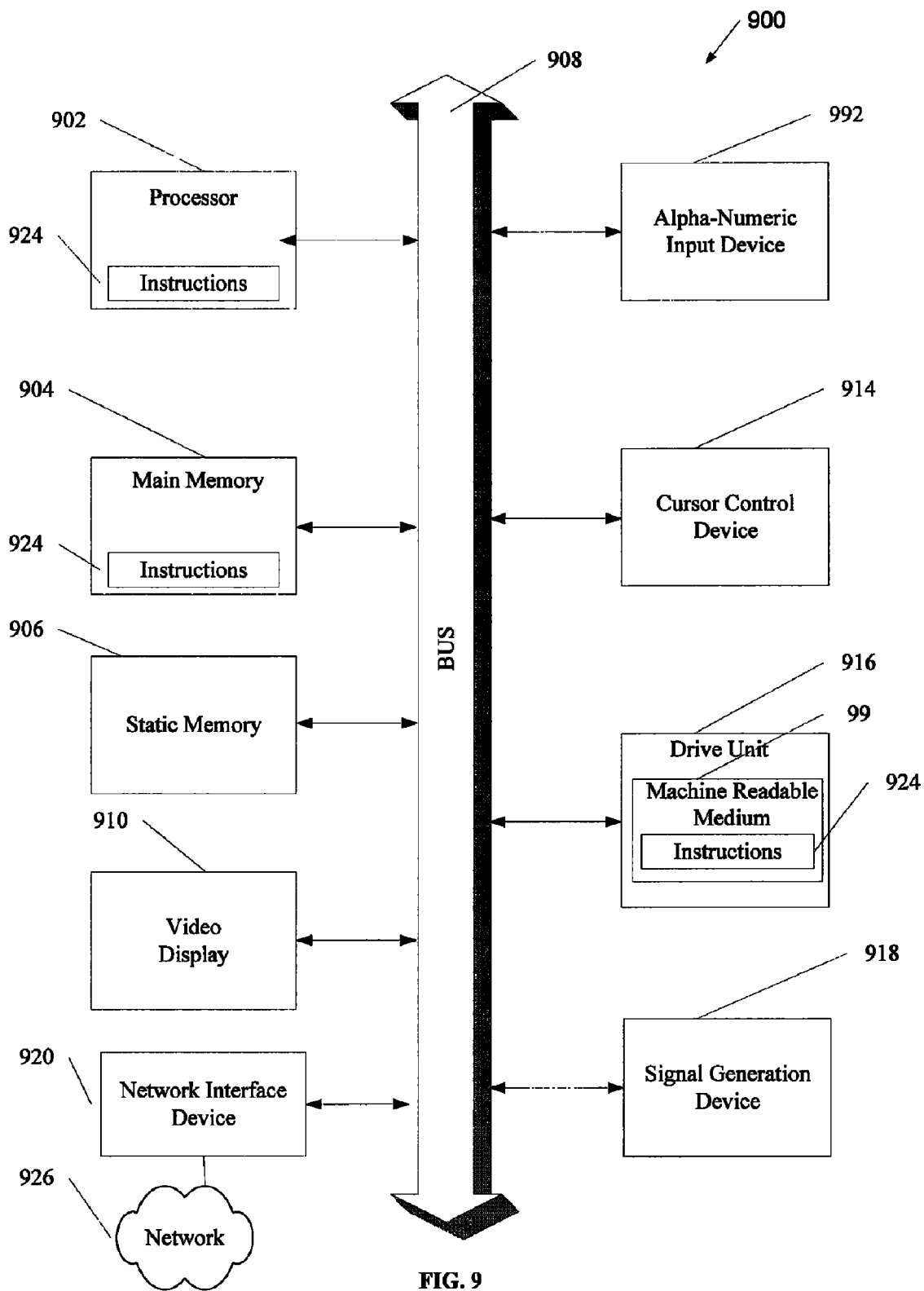
FIG. 9 illustrates a diagrammatic representation of machine in the example form of a computer system 900 within which a set of instructions may be executed to cause the machine to perform any one or more of the methodologies discussed herein.

FIG. 9 illustrates a diagrammatic representation of machine in the example form of a computer system 900 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a storage unit 916 (e.g., hard-disk drive), a signal generation device 918 (e.g., a speaker) and a network interface device 920.

The storage unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media. The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

I claim:

1. A method comprising:
receiving from a user, item data corresponding to an item list including one or more items, at least one of the items being a category of product, a category of service, an occasion associated with the user, or a person associated with the user;
communicating the item list, using one or more processors, to a community group associated with the user;
receiving member data from one or more members of the community group, the member data being associated with one or more items on the item list, the member data comprising a review or a recommendation of an item of the one or more items included in the item list; and
updating the item list based on the received member data.

2. The method of claim 1, further comprising creating the community group based on receiving, from the user, member identification data, the member identification data being based on a selection of one or more groups defined by the user.

3. The method of claim 2, wherein the member identification data corresponds to at least one of one or more other users and one or more other community groups.

4. The method of claim 1, wherein the one or more items include a product or a service, at least one of the items included in the item list being the category of product, the category of service, the occasion associated with the user, or the person associated with the user.

5. The method of claim 1, wherein the receiving of the member data includes receiving member data corresponding to a review of the one or more items of the item list.

6. The method of claim 1, wherein the receiving of the member data includes receiving member data corresponding to a recommendation of a specific product or service associated with the one or more items of the item list.

7. The method of claim 4, wherein the receiving of the member data includes receiving a request to add the product or the service to an electronic shopping cart.

8. The method of claim 4, further including creating an electronic shopping cart indicating that the product of the service from the item list has been selected for purchase, wherein the electronic shopping cart is accessible by each member of the community group.

9. The method of claim 8, further including:
performing an automatic search of online vendors item the product or the service indicated in the electronic shopping cart;
automatically selecting one or more vendors having item the product or the service based on one or more thresholds associated with the purchase of the product or the service; and
automatically purchasing the product or the service available from the one or more vendors based on a single input received from one of the user and a member of the one or more members of the community group.

10. The method of claim 1, further including creating one or more rules associated with at least one of the items of the item list and one or more members of the community group.

11. The method of claim 10, further including preventing one or more selected members from viewing one or more of the items by setting a visibility attribute associated with the one or more items to invisible for the selected members.

12. The method of claim 1, further including creating one or more roles associated with at least one or more members of the community group.

13. The method of claim 12, wherein the one or more roles determines a level of accessibility to attributes and functions of the item list.

14. A system comprising:
an item list module to receive item data from a user, the item data corresponding to an item list including one or more items, at least one of the items being a category of product, a category of service, an occasion associated with the user, or a person associated with the user;
a community group module, having one or more processors, to communicate the item list to a community group associated with the user; and
user input module to receive member data from one or more members of the community group, the member data being associated with one or more items on the item list, the member data comprising a review or a recommendation of an item of the one or more items included in the item list, the user input module further to update the item list based on the received member data.

15. The system of claim 14, wherein the receiving of the member data includes receiving a request to add an item to an electronic shopping cart.

16. The system of claim 14, further including a transaction module to create an electronic shopping cart to indicate which of the items from the item list have been selected for purchase by one or more members of the community group.

17. The system of claim 16, further including:
a search module to:
perform an automatic search of online vendors for each item indicated in the electronic shopping cart; and
select one or more vendors that indicate saleable inventory for each item based on one or more thresholds associated with the purchase of each item; and
the transaction module to automatically purchase each item available from the one or more vendors based on a single input received from one of the user and a member of the community group.

18. The system of claim 17, further including a rules and roles module to create one or more rules associated with at least one of the items of the item list and one or more members of the community group.

19. The system of claim 18, wherein the rules and roles module is to set a visibility attribute associated with one or more items to invisible for the selected members to prevent the one or more selected members from viewing one or more of the items.

20. The system of claim 14, further including a rules and roles module to create one or more roles associated with at least one or more members of the community group.

21. The system of claim 20, including the rules and roles module to determine a level of accessibility to attributes and functions of the item list based on the one or more created roles.

22. The system of claim 14, further including the community group module to receive member identification data from the user and to create a community group based on the received member identification data.

23. A non-transitory machine-readable medium comprising instructions, which when executed by a machine, cause the machine to perform a method comprising:

receiving from a user, item data corresponding to an item list including one or more items, at least one of the items being a category of product, a category of service, an occasion associated with the user, or a person associated with the user;

communicating the item list to a community group associated with the user;

receiving member data from one or more members of the community group, the member data being associated with one or more items on the item list, the member data comprising a review or a recommendation of an item of the one or more items included in the item list; and updating the item list based on the received member data.

24. The machine readable medium of claim 23, further including instructions, which when executed by a machine, cause the machine further:

perform an automatic search of online vendors for each item indicated in the electronic shopping cart;

select one or more vendors having each item based on one or more thresholds associated with the purchase of each item; and automatically purchase each item available from the one or more vendors based on a single click from one of the user and a member of the community group.

* * * * *

UNITED STATES PATENT AND TRADEMARK OFFICE
CERTIFICATE OF CORRECTION

PATENT NO. : 7,996,270 B2  
APPLICATION NO. : 11/278113  
DATED : August 9, 2011  
INVENTOR(S) : Neelakantan Sundaresan Page 1 of 1

It is certified that error appears in the above-identified patent and that said Letters Patent is hereby corrected as shown below:

In column 6, line 14, delete "created by the with list" and insert -- created by the wish list --, therefor.

In column 11, line 60, after "no" insert -- , --.

In column 13, line 54, in Claim 9, delete "item" and insert -- for --, therefor.

In column 13, line 57, in Claim 9, after "having" delete "item".

Signed and Sealed this
Eleventh Day of October, 2011

David J. Kappos
*Director of the United States Patent and Trademark Office*